United States Patent [19]

Grinarml

[11] Patent Number: 4,735,010
[45] Date of Patent: Apr. 5, 1988

[54] SCENT DISPENSER FOR ATTACHMENT UNDER A SHOE

[76] Inventor: Robert Grinarml, R.D. #2, Box 189-B, Cambridge Springs, Pa. 16403

[21] Appl. No.: 30,371

[22] Filed: Mar. 26, 1987

[51] Int. Cl.$^4$ ............................................. A01N 25/00
[52] U.S. Cl. ................................................ 43/1; 239/36
[58] Field of Search ................ 43/1, 4; 222/105, 107, 222/92, 175, 215, 206; 239/36, 55, 56, 57

[56] References Cited

U.S. PATENT DOCUMENTS

| | | | |
|---|---|---|---|
| 1,780,407 | 11/1930 | Smith | 239/36 |
| 1,780,408 | 11/1930 | Smith | 239/36 |
| 2,959,354 | 11/1960 | Beck | 239/36 |
| 3,057,464 | 10/1962 | Baggott, Sr. | 206/315.11 X |
| 4,186,502 | 2/1980 | Foster | 43/1 X |
| 4,374,571 | 2/1983 | Hirvela | 239/36 |
| 4,506,806 | 3/1985 | Lincoln et al. | 222/175 |
| 4,609,245 | 9/1986 | Sakschek | 239/36 |
| 4,682,715 | 7/1987 | Reeves | 43/1 X |

FOREIGN PATENT DOCUMENTS 2579071 9/1986 France ..................................... 43/4

Primary Examiner—Nicholas P. Godici
Assistant Examiner—Carmine Cuda
Attorney, Agent, or Firm—Charles L. Lovercheck; Wayne L. Lovercheck; Dale R. Lovercheck

[57] ABSTRACT

A scent distributing device and method of marking an area using the device to distribute scent. The scent distributing device is provided for use while attached to footwear. The scent distributing device includes a scent source, and a tubular body. The scent source includes a scent absorbing material, and a fluid for attracting animals. The tubular body includes a pair of plug connectors and a wall member. The wall member has at least one aperture therethrough. Scent is introduced into the device. Next, the scent distributing device is connected to footwear. The scent is then distributed in the area to be marked by wearing the footwear while stepping in the area with the scent distributing device connected to footwear.

20 Claims, 1 Drawing Sheet

SCENT DISPENSER FOR ATTACHMENT UNDER A SHOE

BACKGROUND OF INVENTION

The invention relates to hunting or trapping of game animals or for masking the human scent using scent distributed by a scent distributing device and a method of marking an area using the device to distribute scent. The scent distributing device is provided for use while attached to footwear. The improvements of the invention each taken alone or in combination add to resolve the problems of the prior art.

Customarily, hunters apply scent (a commercially available attracter for the game being hunted) to the bottom of their boots. However, this is unsatisfactory because it wears off quickly and must be reapplied frequently. In wet weather the scent is washed off very quickly.

Dehart in U.S. Pat. No. 4,302,899 discloses a hunter's and trapper's scent pad. The device employs an aromatic scent in a sponge.

Foster in U.S. Pat. No. 4,186,502 discloses a scent dispensing boot. A pad impregnated with scent is held within a pocket of the boot having ventilating means for communicating scent to the air.

Bilyeu in U.S. Pat. No. 3,046,192 discloses a scent for attracting wild game animals and a method for its use. the scent is heated while hanging from a tree.

Some of the problems of the prior art include nonuniform rates of scent distribution, especially in wet weather, and short (less than ½ mile) distribution distances.

The improvements of the present invention beneficially provide a novel, nonobvious and useful manner of distributing scent for attacting of game animals using a scent distributing device to mark an area for wildlife observation. The scent distributing device is adapted for use while attached to footwear.

BRIEF DESCRIPTION OF THE INVENTION

The problems of the prior art are overcome by the improved scent distributing device and method of the present invention. The short distance and nonuniform dispensing problems of the prior art are resolved by the improved scent distributing device and method in accordance with the present invention.

The invention provides a scent distributing device and method of marking an area using the device to distribute scent. The scent distributing device is provided for use while attached to footwear. The scent distributing device includes a scent source, and a tubular body. The scent source includes a scent absorbing material, and a fluid for attracting animals. The scent distributing device may be made up of a wall member circular in cross section and a pair of plastic plugs that will engage each end of the wall member and close the ends thereof. The wall member has at least one aperture therethrough. Scent is introduced into the device. Next, the scent distributing device is connected to footwear. An elastic band may extend from plug to plug and be adapted to be placed around the footwear to secure the device in place. The scent is then distributed in the area to be marked by wearing the footwear while walking in the area with the scent distributing device connected to the footwear. A sponge material may be placed in the tubular body to control the rate at which scent is dispersed.

As used herein scent refers to a commercially available animal attracting or masking scent for the game being pursued, or for training dogs. Such scent is commonly used by hunters by applying the scent to the bottom of their boots. Among the more popular scents for attracting animals is scent which attracts deer.

BRIEF DESCRIPTION OF THE DRAWINGS

The objects, features and advantages of the present invention will become more fully apparent from the following detailed description of the preferred embodiment, the appended claims and the accompanying drawings in which:

DETAILED DESCRIPTION OF THE PREFERRED EMBODIMENT

Figure 1:
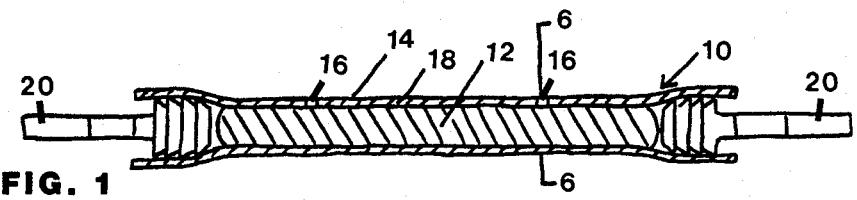
FIG. 1 is a cross-sectional side view of a scent distributing device in accordance with the invention illustrating the tube, the scent absorbing material and the plugs inserted in each end.

The preferred embodiment of the invention is illustrated by way of example in FIGS. 1 through 9. Referring to the Figures, in which like numerals refer to like portions thereof, FIG. 1 shows a cross-sectional view of a scent distribution device 10 in accordance with the present invention. The scent distributing device 10 includes a sponge (or other scent absorbent material) 12 which is provided with scent for use in distributing scent to attract game animals. Scent may be introduced into the sponge 12. The sponge 12 is enclosed by flexible tubular body member 14 in the central substantially cylindrical scent chamber 15. Tube body member 14 is preferably constructed of a flexible transparent plastic such as polypropylene. The tubular body member 14 preferably has an elongated central body portion which is substantially circular in cross-section. Both ends of the tubular body member are closed to retain sponge 12. One or more apertures 16 are provided through the wall 18 of the tubular body member 14. A plastic plug 20 is provided at each end of the tubular body member 14.

Figure 2:
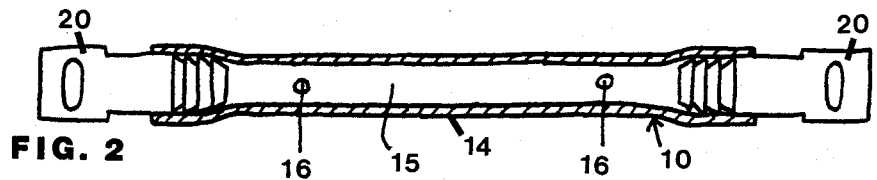
FIG. 2 is a cross sectional side view of the scent distributing device rotated 90° from the position in FIG. 1 in accordance with the invention with the scent absorbing material removed to show the scent dispensing apertures through the tube.

With more particular reference to FIG. 2, it is seen that the scent distributing device 10 is connected by flexible cord 22 around the front portion 24 of boot 26. Boot 26 has a heel 28 and a sole 30.

The tubular body member 14 is connected at each end to the flexible cord 22. Each end of the flexible cord 22 extends through a hole in plug 20. Aperatures 16 of the tubular body member 14 are positioned to open toward the ground 32. The tubular body member 14 is connected by the flexible cord 22 extending around the front portion 24 of boot 26. The tubular body member 14 is positioned beneath the elevated portion of the sole 30 adjacent to the heel 28.

In use the boot 26 is worn on the foot of the individual who will walk through the area in which scent is to be distributed. As the individual, walks, the boot 26 contacts the ground and scent pases from the sponge 12 through the apertures 16 to the ground through compression.

Figure 3:
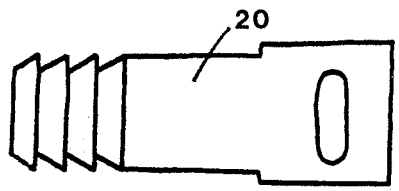
FIG. 3 is a side view of a plug member for the scent distributing device in accordance with the invention.
Figure 4:
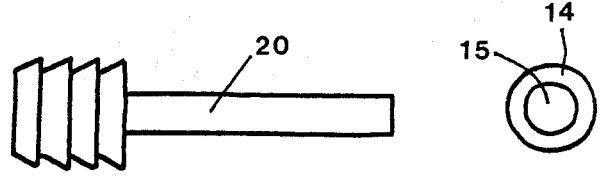
FIG. 4 is a side view of a plug member rotated 90° from the position shown in FIG. 4 in accordance with the invention.
Figure 5:
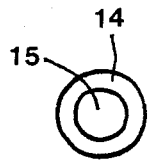
FIG. 5 is an end view of the tube of the scent distributing device in accordance with the invention.
Figure 6:
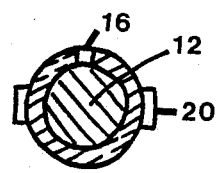
FIG. 6 is an end view of the scent distributing device taken along line 3—3 of FIG. 1 in accordance with the invention.
Figure 7:
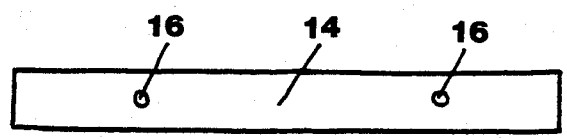
FIG. 7 is a side view of the tube of the scent distributing device in accordance with the invention.
Figure 8:
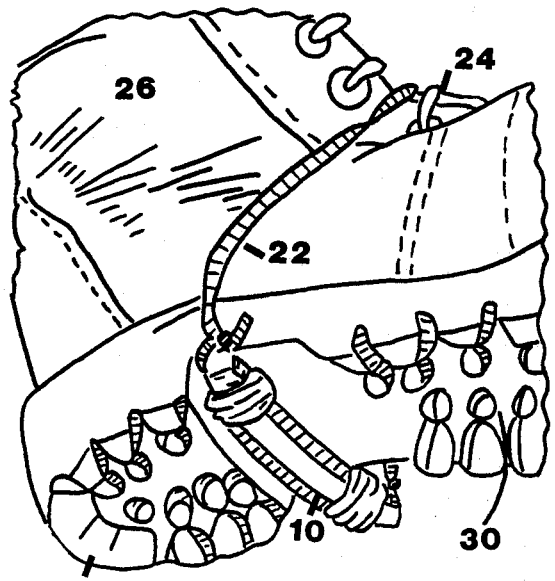
FIG. 8 is a perspective view of the scent distributing device attached to a boot; and, FIG. 9 is a bottom view of the scent distributing device attached to a boot in accordance with the invention.
Figure 9:
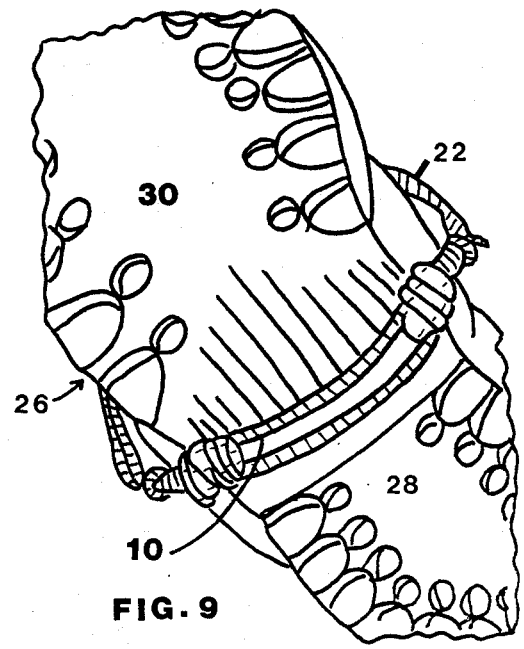

With more particular reference to FIG. 3, a bottom view is seen of the scent distributing device for attachment to footwear in accordance with the invention. A plurality of apertures 16 spaced equidistantly along the length of the tubular wall member each extend through the tubular wall member. The wall member includes a substantially cylindrical central portion 38 between a first end 40 and a second end 42 of the wall member. The first end and the second end of the wall member are substantially closed to hold the scent absorbing material within the central portion. The scent absorbing material is preferably a sponge having fluid scent therein for attracting animals.

Preferably, scent is distributed for from about one to three miles. More preferably, scent is distributed for from about one and a half to two miles. The distribution of scent is at a substantially constant rate even in wet weather.

In operation the scent distributing device of the invention is used in a method of marking an area by distributing scent onto the ground to attract animals. The method includes providing a scent distributor and footwear. The scent distributor includes a scent source, a tubular body. The scent source includes scent absorbing material, and a fluid for attracting animals. The tubular body includes a pair of connectors and a wall member. The wall member has at least one aperture therethrough. The scent distributor is then connected to the footwear. Distribution of the scent in the area to be marked is carried out by wearing footwear while stepping in the area with the scent distributor connected to the footwear.

The footwear attachment is preferably an elastic flexible cord. The flexible cord includes a first and a second end portion and a central portion between the first and the second end portion. The first end portion of the flexible cord is connected to the first end of the tubular wall. The second end of the flexible cord is connected to the second end of the tubular wall.

In position to dispense the central portion of the flexible cord extends above the footwear. The tubular wall is adjacent to the heel and each aperture opens downwardly.

Connected to the body are a first and a second plastic plug. The first plug is connected to the first end of the tubular wall, and the second plug is connected to the second end of the tubular wall. The first end of the flexible cord extends through the first plug, and the second end of the flexible cord extends through the second plug.

A plurality of apertures extend through the tubular wall member, and the scent absorbing material is preferably a sponge, or other absorbent material, having fluid scent therein for attracting animals. The walls member includes a substantially cylindrical central portion between a first end and a second end of the wall member. The first end and the second end of the wall member are substantially closed to hold the scent absorbing material within the central portion.

For example, the scent distributor in accordance with the invention with a flexible substantially nonelastic cord may be used for wildlife observing or for hunting.

A scent distributor is provided having a tube two or three inches long with a ¼ inch inner diameter having three evenly spaced pin holes apertures on a line along one side of the tube. A sponge is provided within the tube and a 12 inch long flexible substantially elastic cord attached to both ends of the tube. The sponge fills the majority of the inner (scent) chamber of the tube. A wildlife observer fills the tube with deer attracting scent into the sponge chamber of the tube. While in the area through which scent is to be distributed with the tube under the tube in front of the heel of his boot the wildlife observer pulls the cord over the top of his boot and moves the tube under the sole to a position immediately adjacent the heel. The apertures of the tube are then positioned to open downwardly. The hunter then walks through the observation area. With each step the scent is dispensed onto the ground. He may walk one or two miles. The distribution of scent is uniform along the path taken by the wildlife observer or hunter. The wildlife observer chooses an obscure spot and waits to observe any deer attracted by the scent.

The foregoing specification sets forth the invention in its preferred, practical forms but the structure shown is capable of modification within a range of equivalents without departing from the invention which is to be understood is broadly novel as is commensurate with the appended claims.

The embodiments of the invention in which an exclusive property or privilege is claimed are defined as follows:

1. A scent dispensing device for distributing scent onto the ground to attract animals comprising:
   footwear attachment means on said dispensing device
   a scent source means,
   a resilient tubular body means,
   said tubular body means comprising a tubular wall member having a first open end and a second open end, a first plug and a second plug,
   said wall member having at least one aperture therethrough,
   said first plug closing said first open end,
   said second plug closing said second open end,
   said scent source means comprising a scent absorbing material,
   said scent source means being enclosed by said tubular body means.

2. The scent dispensing device of claim 1,
   wherein said footwear attachment means comprises a flexible cord,
   said flexible cord comprising a first and a second end and a central portion between said first and said second end, and
   and said first end of said flexible cord being connected to said first plug,
   and said second end of said flexible cord being connected to said second plug.

3. The scent dispensing device of claim 1 further comprising:
   scent material in the scent absorbing material.

4. The combination of claim 3 wherein said scent dispensing device is adapted to be worn on footwear having a heel and said central portion of said flexible cord extends above said footwear,
and said tubular wall is adjacent to said heel and each said aperture opens downwardly.

5. The scent dispensing device of claim 4 further comprising connector means,
said connector means comprising
said first plug being connected to said first end of said tubular wall,
said second plug being connected to said second end of said tubular wall,
said first end of said flexible cord extending through said first plug,
and said second end of said flexible cord extending through said second plug.

6. The scent dispensing device of claim 1 further comprising a plurality of apertures through said wall member,
and wherein said scent absorbing material is a sponge having fluid scent therein for attracting animals.

7. The scent dispensing system of claim 1 wherein said wall member includes a substantially cylindrical central portion between a first end and a second end of said wall member,
said first end and said second end of said wall member being substantially closed to hold said scent absorbing material within said cylindrical central portion.

8. A scent dispensing system for distributing scent onto the ground to attract animals comprising:
providing footwear having a bottom side,
a scent source means comprising a resilient tubular body means,
support means on said tubular body means for supporting said tubular body means on said bottom side of said footwear,
footwear attachment means,
said scent source means being supported within said tubular body means,
said tubular body means comprising a tubular wall member,
said tubular wall member having at least one aperture therethrough,
said footwear attachment means being connected to said tubular body means.

9. The scent dispensing system of claim 8 wherein said attachment means comprises a flexible cord,
said flexible cord comprising a first and a second end and a central portion between said first and said second end,
and wherein said tubular wall member further comprises a first and a second end,
and said first end of said flexible cord is connected to said first end of said tubular wall,
and said second end of said flexible cord is connected to said second end of said tubular wall.

10. The scent dispensing system of claim 9 further comprising a shoe,
said shoe comprising a heel,
said flexible cord being elastic,
and said scent source means further comprises fluid scent adapted for attracting wildlife or training dogs.

11. The scent dispensing system of claim 10 wherein said central portion of said flexible cord extends above and attaches to said footwear,
and said tubular wall is adjacent to said heel and each said aperture opens downwardly.

12. The scent dispensing system of claim 8 further comprising connector means,
said connector means further comprises a first plug and a second plug,
said first plug being connected to said first end of said tubular wall,
and said second plug being connected to said second end of said tubular wall,
said first end of said flexible cord extending through said first plug,
and said second end of said flexible cord extending through said second plug.

13. The scent dispensing system of claim 8 wherein said wall member includes a substantially cylindrical central portion between a first end and a second end of said wall member,
said first end and said second end of said wall member being substantially closed to hold said scent absorbing material within said central portion.

14. A method of marking an area by distributing scent onto the ground to attract animals comprising:
(a) providing a scent distributing means and footwear means having an under side,
said scent distributing means comprising:
a tubular body means,
a scent source means in said tubular body means,
said scent source means comprising a scent absorbing material and a fluid for attracting animals,
said tubular body means comprising a connector means for supporting said tubular body on said under side of said footwear means and said tubular body means having a wall member,
said wall member having at last one aperture therethrough,
said method further comprising:
(b) connecting said scent distributing means to said footwear means, and
(c) distributing said scent in the area to be marked by wearing said footwear means while stepping in the area with said scent distributing means connected to said footwear means.

15. The method of marking an area by distributing scent onto the ground to attact animals of claim 14 further comprising footwear attachment means,
wherein said footwear attachment means comprises a flexible cord,
said flexible cord comprising a first and a second end and a central portion between said first and said second end,
and wherein said tubular wall comprises a first and a second end,
and said first end of said flexible cord is connected to said first end of said tubular wall,
and said second end of said flexible cord is connected to said second end of said tubular wall.

16. The method of marking an area by distributing scent onto the ground to attract animals of claim 14 wherein said footwear comprising a heel,
the forward side of said heel being substantially flat,
and said wall member being substantially cylindrical,
said cylindrical wall member being positioned with its central axis substantially parallel to the plane of the forward side of the heel.

17. The method of marking an area by distributing scent onto the ground to attract animals of claim 16 wherein said central portion of said flexible cord extends above said footwear, and said tubular wall is adjacent to said heel and each said aperture opens downwardly, compressing with each step and dispensing scent.

18. The method of marking an area by distributing scent onto the ground to attract animals of claim 17 wherein said connector means further comprises a first and a second plug, said first plug being connected to said first end of said tubular wall, and said second plug being connected to said second end of said tubular wall, said first end of said flexible cord extending through said first plug, and said second end of said flexible cord extending through said second plug.

19. The method of marking an area by distributing scent onto the ground to attract animals of claim 14 further comprising a plurality of apertures through said wall member, and wherein said scent absorbing material is a sponge having fluid scent therein for attracting animals.

20. The method of marking an area by distributing scent onto the ground to attract animals of claim 19 wherein said wall member includes a substantially cylindrical central portion between a first end and a second end of said wall member, said first end and said second end of said wall member being substantially closed to hold said scent absorbing material within said central portion.

* * * * *